(12) United States Patent
Prok et al.

(10) Patent No.: US 9,669,375 B2
(45) Date of Patent: Jun. 6, 2017

(54) METHOD FOR PRODUCTION OF STABLE CERIUM OXIDE ORGANIC COLLOIDS

(71) Applicant: Cerion Enterprises, LLC, Rochester, NY (US)

(72) Inventors: Gary Robert Prok, Rush, NY (US); Stephen Charles Williams, Rochester, NY (US)

(73) Assignee: CERION, LLC, Rochester, NY (US)

(*) Notice: Subject to any disclaimer, the term of this patent is extended or adjusted under 35 U.S.C. 154(b) by 0 days.

(21) Appl. No.: 13/753,992

(22) Filed: Jan. 30, 2013

(65) Prior Publication Data

US 2013/0197107 A1 Aug. 1, 2013

Related U.S. Application Data

(60) Provisional application No. 61/632,778, filed on Jan. 30, 2012.

(51) Int. Cl.
*B01J 13/00* (2006.01)

(52) U.S. Cl.
CPC ......... *B01J 13/0047* (2013.01); *B01J 13/003* (2013.01)

(58) Field of Classification Search
CPC .. B01J 13/003; B01J 13/0047; C01F 17/0043; C10L 1/10; C10L 1/1233; C10L 10/00; C10L 10/06
(Continued)

(56) References Cited

U.S. PATENT DOCUMENTS 4,545,923 A * 10/1985 Gradeff et al. .............. 516/33
4,568,360 A    2/1986 Brisset et al.
(Continued)

FOREIGN PATENT DOCUMENTS

| AU | 698799 B | 8/1995 |
|----|----------|--------|
| FR | 2716388  | 8/1995 |

(Continued)

OTHER PUBLICATIONS

Machine Translation of Publ. No. FR 2 716 388 (A1), published Aug. 25, 1995, European patent Office, obtained online @ http://worldwide.espacenet.com/publicationDetails/claims?CC=FR&NR=2716388A1&KC=A1&FT=D&ND=3&date=19950825&DB=worldwide.espacenet.com&locale=en_EP (Downloaded Sep. 16, 2014), pp. 1-21.*

(Continued)

*Primary Examiner* — Daniel S Metzmaier
(74) *Attorney, Agent, or Firm* — Ratnerprestia

(57) ABSTRACT

An improved process for producing substantially non-polar doped or un-doped cerium oxide nanoparticle dispersions is disclosed. The cerium-containing oxide nanoparticles of an aqueous colloid are transferred to a substantially non-polar liquid comprising one or more amphiphilic materials, one or more low-polarity solvents, and one or more glycol ether promoter materials. The transfer is achieved by mixing the aqueous and substantially non-polar materials, forming an emulsion, followed by a phase separation into a remnant polar solution phase and a substantially non-polar organic colloid phase. The organic colloid phase is then collected. The promoter functions to speed the transfer of nanoparticles to the low-polarity phase. The promoter accelerates the phase separation, and also provides improved colloidal stability of the final substantially non-polar colloidal dispersion. Importantly, the glycol ether promoter reduces the temperature necessary to achieve the phase separation, while providing high extraction yield of nanoparticles into the low-polarity organic phase.

12 Claims, 1 Drawing Sheet

(58) Field of Classification Search
USPC ....... 516/33, 22; 44/354, 356, 364; 502/302, 502/303, 304
See application file for complete search history.

(56) References Cited

U.S. PATENT DOCUMENTS

| | | | |
|---|---|---|---|
| 6,136,048 | A | 10/2000 | Chimie |
| 6,210,451 | B1 | 4/2001 | Chopin |
| 6,271,269 | B1 | 8/2001 | Chane-Ching et al. |
| 6,649,156 | B1* | 11/2003 | Chane-Ching ............... 424/70.9 |
| 7,459,484 | B2 | 12/2008 | Blanchard et al. |
| 8,679,344 | B2* | 3/2014 | Allston et al. ................ 210/644 |
| 8,883,865 | B2* | 11/2014 | DiFrancesco et al. .......... 516/88 |
| 2006/0005465 | A1 | 1/2006 | Blanchard et al. |
| 2010/0152077 | A1 | 6/2010 | Allston et al. |
| 2010/0242342 | A1 | 9/2010 | Reed et al. |
| 2013/0109600 | A1* | 5/2013 | Reed et al. .................... 508/165 |
| 2013/0192122 | A1* | 8/2013 | Prok et al. ....................... 44/280 |
| 2013/0197107 | A1 | 8/2013 | Prok |
| 2015/0059236 | A1* | 3/2015 | DiFrancesco et al. .......... 44/354 |
| 2015/0059237 | A1* | 3/2015 | DiFrancesco et al. .......... 44/357 |

FOREIGN PATENT DOCUMENTS

| | | |
|---|---|---|
| GB | 1571210 | 7/1980 |
| JP | S53012907 | 2/1978 |
| JP | S59172592 A | 9/1984 |
| JP | H62-038263 A | 2/1987 |
| JP | H07-284651 A | 10/1995 |
| JP | 11501609 A | 2/1999 |
| JP | 2003506529 A | 2/2003 |
| WO | 2013116300 | 8/2013 |

OTHER PUBLICATIONS

Derwent Abstract on EAST, week 200610 , London: Derwent Publications Ltd., AN 1995-312586 , Class A60, JP 07284651 A; U.S. Pat. No. 6,210,451 B1; AU 9512317 a; & AU 698799 B, (Rhone Poulenc Chim), abstract.*
Derwent Abstract on EAST, week 200147, London: Derwent Publications Ltd., AN 1986-341190, Class E12, JP 62038236 A & U.S. Pat. No. 6,271,269 B1, (Rhone-Poulenc Spec), abstract.*
Derwent Abstract on East, week 200528, London: Derwent Publications Ltd., AN 1997-300663, Class A60, JP 11501609 W & U.S. Pat. No. 6,136,048 A, (Rhone-Poulenc Spec), abstract.*
Derwent Abstract on EAST, week 200903, London: Derwent Publications Ltd., AN 2001-259829 , Class E37, JP 2003506529 W & US 20060005465 A1, (Rhodia Electronic & Catalysis Inc), abstract.*
International Search Report and Written Opinion corresponding to PCT/US2013/024342, mailed Oct. 1, 2013.
International Search Report and Written Opinion corresponding to PCT/US2013/023790, mailed Aug. 6, 2013.
International Preliminary Report on Patentability for Corresponding PCT/US2013/023790, Issued Aug. 5, 2014.
International Preliminary Report on Patentability for Corresponding PCT/US2013/024342, Issued Aug. 5, 2014.
U.S. Appl. No. 13/756,971, filed, Feb. 1, 2013, entitled, "Rapid Method for Production of Cerium-Containing Oxide Organic Colloids ."
Office Action mailed Jun. 5, 2015 in U.S. Appl. No. 13/756,971.
Office Action mailed Sep. 25, 2014 for U.S. Appl. No. 13/756,971.
EP Examination Report dated Feb. 11, 2016 for EP Application No. 13704313.9.
Australian First Examination Report dated Jul. 18, 2016 for Australian Application No. 2013215258, 3 pages.
Australian First Examination Report dated Jul. 15, 2016 for Australian Application No. 2013214899, 4 pages.
Japanese Office Action/Notice of Reasons for Rejection, with English language translation for Application No. 2014-555752, dated Feb. 9, 2017, 10 pages.
Notice of Reasons for Rejection for Japanese Application No. 2014-555663, dated Feb. 28, 2017, with English translation, 10 pages.

* cited by examiner

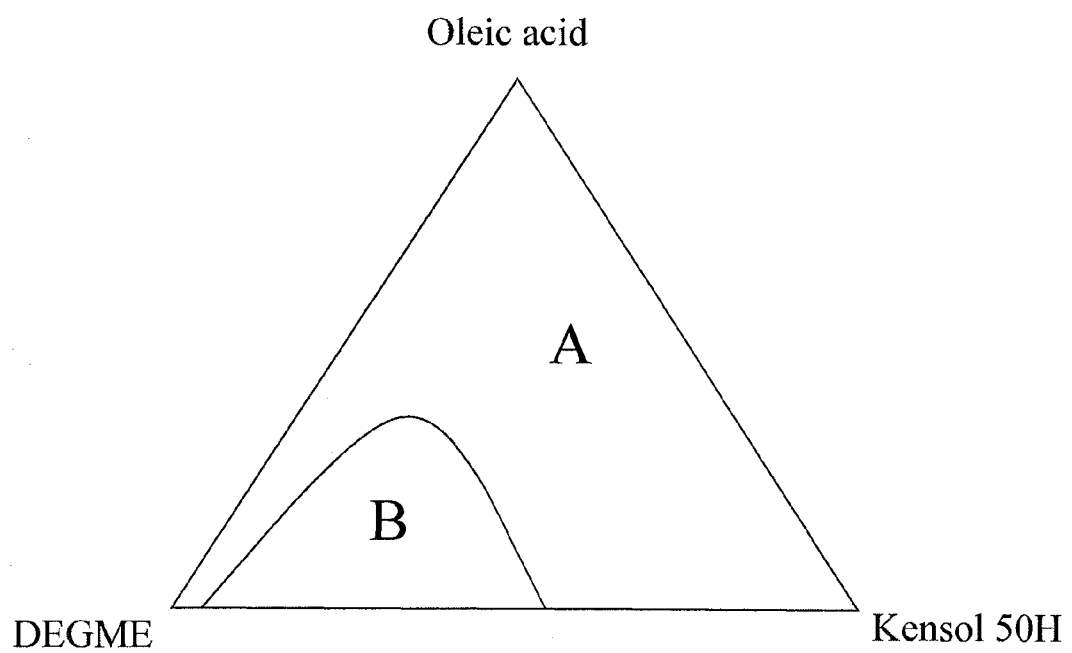

METHOD FOR PRODUCTION OF STABLE CERIUM OXIDE ORGANIC COLLOIDS

CROSS-REFERENCE TO RELATED APPLICATIONS

This application claims the benefit of priority to Provisional Application Serial . No. 61/632,778, IMPROVED METHOD FOR PRODUCTION OF STABLE CERIUM OXIDE ORGANIC COLLOIDS, filed Jan. 30, 2012, the disclosure of which is incorporated herein by reference in its entirety.

FIELD OF THE INVENTION

The present invention relates generally to colloidal nanoparticle dispersions and more specifically to improved processes for the manufacture of doped and un-doped cerium oxide colloidal dispersions in solvents having low-polarity.

BACKGROUND OF THE INVENTION

Cerium-containing oxide nanoparticles have many current industrial uses, along with many emerging technical applications. They are well known as important components, for example, in three-way automotive exhaust catalysts, automotive fuel borne catalysts, water gas shift reaction catalysts, polishing and planarization agents, solid oxide fuel cells, hybrid solar cells and ultra-violet sun blockers. There are many synthetic processes for the production of metal oxides, including aqueous and hydrothermal precipitation, spray precipitation, combustion, plasma deposition and electrochemical techniques, among others. While a variety of solvents may be used in these synthetic processes, aqueous reaction chemistries are particularly favored in manufacturing processes where high material through-put is desired. However, conventional aqueous processes—precipitation in particular—are costly as they involve multiple steps that are often time and energy consuming, as well as equipment intensive.

Conventional large-scale metal oxide manufacturing processes can typically be divided into three stages: aqueous precipitation of precursor compounds, calcination to promote chemical reaction and to enhance crystallinity, followed by final particle size adjustment. In more detail, aqueous precipitation includes the initial steps of reactant delivery, reactant dispersal, particle precipitation, isolation, washing, drying, and optional impregnation with other metal ions; calcination involves heating to 400-1000° C. for several hours; followed by grinding, milling or classification to adjust the final particle size, among other steps.

One approach to reduce the number of steps in the aqueous preparation is to employ methods that produce a stable aqueous dispersion (suspension, colloid, sol) of the final particles directly from the initial reactants, thereby avoiding the time, cost and potential contamination inherent in the particle precipitation, isolation, and drying steps. Moreover, if the particles produced in such a direct method are sufficiently pure, wherein the chemical composition of the particles is as desired, and the particles are sufficiently crystalline, then the calcination step may also be eliminated. In addition, if the particle size and size distribution produced by such a direct method are substantially as desired, then the grinding, milling and classification steps may also be eliminated. Direct methods to produce aqueous dispersions (suspensions, colloids, sols) of crystalline cerium-containing oxide nanoparticles without the use of precipitation, isolation, drying, calcination, grinding, milling or classification steps, and the like, are described in commonly assigned U.S. patent application Ser. No. 12/779,602, now Publication US 2010/0242342 A1, by A. G. DiFrancesco et al. The '342 reference discloses stable aqueous dispersions of crystalline cerium-containing nanoparticles in a size range, for example, of 1-5 nanometers.

While substantial progress has been made in eliminating manufacturing steps from the synthetic process by which stable aqueous dispersions of metal oxide nanoparticles are prepared, use of these nanoparticles in applications such as fuel-borne combustion catalysts requires that dispersions of these nanoparticles also exhibit colloidal stability in the fuel. Such stability would also be required for a fuel additive, miscible in the fuel. Thus, these particles, although readily formed and suspended in a highly polar aqueous phase, must then be transferred to a substantially non-polar phase, a process known as solvent shifting. This problem is conventionally addressed by the use of particle stabilizers. However, most particle stabilizers used to prevent particle agglomeration in an aqueous environment are ill-suited to the task of stabilization in a non-polar environment. When placed in a non-polar solvent, such particles tend to immediately agglomerate and, consequently, lose some, if not all, of their desirable particulate properties. Changing stabilizers can involve a difficult displacement reaction or separate, tedious isolation and re-dispersal methods such as, for example, precipitation and subsequent re-dispersal with a new stabilizer using, for instance, a ball milling process, which can take several days and tends to produce polydisperse size frequency distributions.

One approach to simplifying the solvent shifting process employs diafiltration methods and glycol ether solvents having a polarity intermediate between that of water and those of non-polar hydrocarbons. The intermediate polarity colloid is then further shifted to reduce the polarity of the cerium-containing nanoparticle dispersion, as disclosed in commonly assigned U.S. patent application Ser. No. 12/549,776, now Publication US 2010/0152077A1 to Alston et al. Diafiltration, sometimes referred to as cross-flow microfiltration, is a tangential flow filtration method that employs a bulk solvent flow that is tangential to a semi-permeable membrane. However, drawbacks of diafiltration methods include the following: relatively slow filtration rates, substantial financial investment in equipment (e.g. pumps and microfilters), and production of a relatively large amount (e.g. several turnover volumes) of waste solvent.

Use of promoter agents to accelerate transfer of iron oxide nanoparticles from aqueous to non-polar solvents is known in the art. U.S. Pat. No. 7,459,484 to Blanchard et al. discloses use of promoter materials having alcohol functionality and having 6 to 12 carbon atoms to promote transfer, and to improve stability of the organic colloid so formed. US Patent Application Publication 2006/0005465 A1 to Blanchard et al. discloses contact of basic aqueous colloids of rare earth or mixed rare earth/other oxide nanoparticles with an acid and a diluent to form an organic colloid dispersion. U.S. Pat. No. 6,271,269 to Chane-Ching et al. discloses direct transfer of cerium oxide or doped cerium oxide colloidal particles from a counterpart aqueous dispersion. Use of alcohol-based promoters is disclosed as well. However, high process temperatures and times for the transfer of the colloidal particulates represent a significant limitation of the prior art process. It is also apparent that concern over the presence of ionic constituents, and other materials needed to bring about the formation of the colloidal particulate material in the aqueous reaction mixture, affects the viability of the direct process.

Thus, progress has been achieved in reducing the cost of producing and solvent shifting aqueous dispersions of cerium-containing nanoparticles. However, further improvements in manufacturing efficiency are desired, particularly in the case of nanoparticle dispersions used as fuel-borne combustion catalysts that require dispersion stability in both a low-polarity solvent carrier of a fuel additive or in the fuel itself.

It would be very desirable to transfer oxide nanoparticles directly from the aqueous reaction mixture in which the nanoparticles are formed, to a substantially non-polar phase, at low temperatures, to reduce manufacturing hazards in dealing with combustible liquids. At the same time it is desirable that the nanoparticle colloidal dispersions that are the fuel additives exhibit excellent colloidal stability and good fluid flow properties at low ambient temperatures.

SUMMARY OF THE INVENTION

The present invention has various embodiments that provide simple, rapid, low temperature processes for the production of stable doped or un-doped cerium oxide nanoparticle dispersions in solvent systems having low-polarity.

In a first aspect, the invention is directed to an improved process that uses conventional cerium-containing oxide aqueous nanoparticle dispersions. The nanoparticles of the aqueous dispersion are transferred to a substantially non-polar liquid comprising one or more amphiphilic materials, one or more low-polarity solvents, and a glycol ether promoter material. The transfer is achieved by mixing the aqueous dispersion and substantially non-polar liquid, wherein an emulsion is formed, followed by a phase separation into a remnant polar solution phase and a substantially non-polar dispersion phase, and then a collection of the substantially non-polar (low-polarity) dispersion phase. The promoter may function to speed the transfer of nanoparticles to the low-polarity phase. The promoter may accelerate the phase separation, and may also provide improved dispersion stability of the final substantially non-polar dispersion phase. In particular embodiments, the glycol ether promoters reduce the temperature necessary to achieve the phase separation while providing high extraction yield of nanoparticles into the low-polarity phase. Low temperatures and reduced time at temperature during the processing have benefits of lower process energy costs and, moreover, reduced risk of hazard in managing the often combustible organic low-polarity solvents during processing, as well as simplifying equipment and facility requirements.

In at least one embodiment, a process for preparing a colloidal dispersion, comprises:
(a) preparing an aqueous colloidal dispersion of cerium-containing oxide nanoparticles;
(b) adding a substantially non-polar solvent, an amphiphilic material, and at least one glycol ether;
(c) mixing the liquid mixture of step (b) to form an emulsion;
(d) heating the emulsion to a predetermined temperature for a predetermined time, thereafter the emulsion separates into a substantially non-polar colloidal phase and a remnant aqueous phase; and,
(e) collecting the separated substantially non-polar colloidal dispersion of cerium-containing oxide nanoparticles.

In a second aspect, the invention is directed to an improved process wherein conventional cerium-containing oxide nanoparticle precipitates are collected from an aqueous reaction mixture in which they were formed. Collection can be by filtration, centrifugation, and the like, and may include washing to remove unwanted constituents from the aqueous reaction mixture. The washed nanoparticulates may then be in the form of a powder or a paste. The nanoparticles are then re-dispersed into an aqueous phase. The nanoparticles of the aqueous dispersion are transferred to a substantially non-polar liquid comprising one or more amphiphilic materials, one or more low-polarity solvents, and a glycol ether promoter material. The transfer may be achieved by mixing the aqueous dispersion and substantially non-polar liquid, wherein an emulsion is formed, followed by a phase separation into a remnant polar solution phase and a substantially non-polar dispersion phase, and then a collection of the substantially non-polar (low-polarity) dispersion phase. The promoter may function to speed the transfer of nanoparticles to the low-polarity phase. The promoter may accelerate the phase separation, and may also provide improved dispersion stability of the final substantially non-polar dispersion phase. In particular embodiments, the glycol ether promoters reduce the temperature necessary to achieve the phase separation while providing high extraction yield of nanoparticles into the low-polarity phase. Low temperatures and reduced time at temperature during the processing may provide benefits of lower process energy costs and, moreover, reduced risk of hazard in managing the often combustible organic low-polarity solvents during processing, as well as simplifying equipment and facility requirements.

In a third aspect, the invention provides an improved process wherein conventional steps of aqueous nanoparticle isolation and washing may be eliminated, dramatically simplifying prior art processes, the inventive process reduces the process temperatures while reducing process waste, to significant economic advantage. Process simplification may be achieved by directly using the aqueous colloid resulting from the nanoparticle synthesis reaction mixture for extraction of nanoparticles to form the substantially non-polar dispersion. The aqueous colloid may be mixed with a substantially non-polar solvent or mix of solvents, along with one or more amphiphilic materials and a glycol ether promoter material, to form an emulsion. The emulsion separates rapidly at low process temperatures into a low-polarity colloid phase and a remnant aqueous solution phase. The substantially non-polar colloid may be collected, thereby achieving a stable substantially non-polar dispersion, nearly entirely free of contaminants present in the aqueous phase. The promoter material may function to accelerate the separation of the emulsion while lowering the process temperature, to stabilize the low-polarity dispersion, and, in some embodiments, to achieve desired low temperature flow characteristics for the low-polarity dispersion.

In another aspect, the invention relates to a variant of the first aspect, wherein the addition of the glycol ether promoter follows an aging (i.e. holding) period for the emulsion formed from mixing the aqueous dispersion phase, the substantially non-polar solvent, and the amphiphilic material.

In another aspect, the inventive transfer process of cerium-containing oxide nanoparticles from an aqueous dispersion phase to a substantially non-polar dispersion phase may be accomplished at low process temperatures and/or with substantially complete transfer of nanoparticles to the substantially non-polar dispersion phase.

In a further aspect, the invention provides cerium-containing oxide nanoparticles in a stable, substantially nonpolar dispersion at low process temperatures, and having desired low temperature flow and other characteristics, by further addition of a glycol ether compound, or a mix of such compounds, to the separated substantially non-polar dispersion.

In yet another aspect, the inventive transfer process provides a substantially non-polar dispersion of cerium-containing oxide nanoparticles by a rapid, complete transfer of nanoparticles, with excellent dispersion stability over the useful operating temperature range of the dispersion.

In a still further aspect, the invention is directed to the processes set forth above, wherein the substantially non-polar dispersion of nanoparticles comprising cerium and iron oxides, is a fuel additive. The fuel additive produced by the inventive process is characterized as having reduced contamination from ionic constituents, aqueous stabilizer material, and free water, wherein such components originate in the aqueous synthetic reaction mixture.

BRIEF DESCRIPTION OF THE DRAWINGS

The FIGURE is a ternary phase diagram representing combinations of a set of exemplary non-polar solvent, amphiphilic agent, and glycol ether promoter, of the invention.

DETAILED DESCRIPTION OF THE INVENTION

For effectiveness in many end-use applications, nanoparticle size distributions with mean diameters ranging from below about 100 nm to below about 3 nm are useful.

As used herein, the terms dispersion, colloid, suspension, sol, colloid dispersion, and colloidal dispersion are used interchangeably to mean a stable biphasic mixture of a discontinuous phase (e.g., nanoparticles) within a continuous phase (e.g., liquid or other solvent medium).

As used herein, the term cerium-containing oxide includes doped and un-doped cerium oxides. Doped cerium oxide compounds include those with the formula $Ce_{(1-x)}M_xO_{(2-\delta)}$ where M is a divalent or trivalent metal and $\delta$ is indicative of oxygen vacancies. It should be recognized by one skilled in the chemical art that dopant metal M, in addition to being either substitutionally or interstitially doped into the cerium oxide crystal structure, could be present as oxides of metal M, either as separate nanoparticles or nanocrystals, or as nanoparticles or nanocrystals in agglomeration (composite) with other doped or un-doped cerium oxide nanocrystals. In various embodiments, nanoparticles comprised of crystalline substitutionally doped or un-doped cerium oxide phases, are present. In other embodiments, nanoparticles comprised of non-crystalline metal oxide phases, such as amorphous iron oxide phases, are present. In various embodiments, dopant metal M is Fe, Zr, Pd, Pt, Ag, Co, Cu, and Ni. In particular embodiments, nanoparticles of a nominal composition of $Ce_{(1-x)}Fe_xO_{(2-\delta)}$ wherein x ranges from about 0.01 to 0.8, or from about 0.5 to 0.7, and $\delta$ ranges from about 1 to 2, such as, for example, from about 1.5 to 2, are employed in the inventive process.

The invention relies in part, on the discovery of the effectiveness of certain glycol ethers in aiding the extraction or transfer of doped or un-doped cerium oxide nanoparticles or mixtures thereof from aqueous to substantially non-polar solvents, at low process temperatures. In particular, the choice of a glycol ether, such as diethylene glycol monomethyl ether (DEGME), has been discovered by the inventors to accelerate the phase separation of aqueous and substantially non-polar colloid phases formed by the mixing of aqueous colloidal solutions with substantially non-polar materials (liquids) including a low-polarity solvent or mix of low-polarity solvents, one or more amphiphilic materials, and one or more specific glycol ethers. The mixing of the aqueous colloid and the substantially non-polar materials (liquids) provides an emulsion. In the presence of certain particular glycol ethers, the emulsion separates at room temperature or modestly elevated temperatures into an aqueous solution phase and a substantially non-polar colloid containing substantially all of the nanoparticles from the aqueous colloid, the amphiphilic material, and a portion of the glycol ether. In particular embodiments, wherein the nanoparticles exhibit substantial coloration, the efficiency or degree of transfer of the nanoparticles from the aqueous phase to the non-polar phase, may be qualitatively assessed by visual observation.

In particular embodiments, additional glycol ether materials may be added to the substantially non-polar colloid to enhance colloidal stability, to enhance low temperature flow properties, and/or to raise the flashpoint temperature of the substantially non-polar colloid. In other embodiments, materials useful for modifying the low temperature flow characteristics and flash points the substantially non-polar colloid include low molecular weight organic liquids such as alcohols and diols.

In particular embodiments, the glycol ether promoter may reduce the temperature necessary to achieve phase separation while providing high extraction yield of nanoparticles to the organic phase. Low temperatures and lower time at temperature during the processing have benefits of lower process energy costs and, moreover, reduced risk of hazard in managing the organic combustible materials during processing, as well as simplifying equipment and facility requirements.

As mentioned previously, U.S. Pat. No. 6,271,269 to Chane-Ching et al. discloses direct transfer of cerium oxide or doped cerium oxide colloidal particles from a counterpart aqueous dispersion. The range of temperatures disclosed for the transfer reaction is from higher than 60° C. to 150° C., with a preferred range of from 80-100° C. Disclosed examples were carried out at 90° C.

In particular embodiments, substantially non-polar (low-polarity) solvents include, alone or in combination, aliphatic hydrocarbons and mixtures thereof, and alicyclic hydrocarbons and their mixtures. In other embodiments, non-polar solvents include diesel fuel, biodiesel fuel, naphtha, kerosene, gasoline, and commercially available petroleum derivatives such as isoparafin distillates (e.g., Isopar®), hydrotreated petroleum distillates (e.g., Kensol® 4811 and Kensol® 50H available from American Refining Group, Ltd of Bradford, Pa. (USA); or Calumet 420-460 available from Calumet Lubricants Co. of Cotton Valley, La. (USA)). Kensol® 48H and 50H are used in particular embodiments as components of fuel-additive applications of the invention because of their low sulfur content, high flashpoint, and low concentration of components having unsaturated bonds. Solvents having some concentration of aromatics, for example, Solvesso® type solvents, may be useful for the purposes of the invention. Low cost may be another driver for the choice of a particularly preferred substantially non-polar solvent. In various embodiments, the substantially non-polar solvent comprises from about 50-65 wt. % of the total substantially non-polar liquid used to form the emulsion mixture.

In particular embodiments, amphiphilic materials include monocarboxylic acids having from 6 to 22 carbon atoms, dicarboxylic acids, polycarboxylic acids, and combinations thereof In particular embodiments, monocarboxylic acid materials include, for example, oleic acid, stearic acid, linoleic acid, linolenic acid, and isomers thereof, alone or in combination. In particular embodiments, dicarboxylic acids include, for example, derivatives of succinic acid, such as polyisobutylene succinic acid, and anhydrides thereof The amphiphilic materials may also characterized in that they are soluble in non-polar hydrocarbon diluents, such as kerosene, isoparafin and hydrotreated petroleum distillates, which in turn are compatible with most hydrocarbon fuels, such as gasoline, diesel and biodiesel, and lubricating oils. In various embodiments, the amphiphilic materials comprise from about 25-33 wt. % of the total substantially non-polar liquid used to form the emulsion mixture.

In particular embodiments, glycol ether promoters include, for example, diethylene glycol monomethyl ether (DEGME), propylene glycol monomethyl ether (PGME), diethylene glycol monoethyl ether, diethylene glycol monobutyl ether, dipropylene glycol methyl ether, ethylene glycol monomethyl ether, ethylene glycol monoethyl ether, ethylene glycol monopropyl ether, and mixtures thereof Choice of particular glycol ether promoters may be based in part on efficacy of low temperature acceleration of extraction of nanoparticles from aqueous to a substantially non-polar phase. It has been found that the level of glycol ether present may be sensitive, there being a threshold for the beneficial acceleration of the separation of the emulsion to give a stable high yield substantially non-polar colloid. Consideration of the miscibility and stability, as will be discussed further below, of the ternary combination of non-polar solvent, amphiphilic agent, and the glycol ether may also be a factor in the determination of the appropriate level of glycol ether in the process and in the final product. Other considerations for the specific choice of and relative amount of glycol ether include satisfying product requirements regarding cost, low temperature flow, flashpoint, and health/environmental considerations. In various embodiments, the glycol ether promoters comprise from about 5-25 wt. % of the total substantially non-polar liquid used to form the emulsion mixture.

The aqueous doped or un-doped cerium oxide colloid that is to be directly transferred or extracted into a non-polar phase could be formed according to a number of known approaches. For example those described in copending U.S. application Ser. No. 12/779,602 now published as US2010/0242342, to Reed et al, incorporated herein by reference, are applicable. In some embodiments of the invention, such an aqueous colloid as formed in its reaction vessel is directly useful for transfer to substantially non-polar colloid phase, even though the aqueous colloids have constituent components comprising reactant remnants and addenda. In other embodiments, nanoparticles formed as aqueous colloids using other well-known processes can be isolated and washed and then re-dispersed in water to form another aqueous colloid that can be used as a starting material for the inventive transfer process discussed herein.

In particular embodiments, the temperature range for the formation of the emulsion, transfer of the nanoparticles between aqueous and substantially non-polar phases, and separation of the emulsion, may range from about 20° C. to 60° C. In a particular embodiment, a temperature of about 40° C. is used because an aqueous colloid in which the nanoparticles are faulted directly, will often be substantially above 40° C. at the conclusion of the aqueous nanoparticle synthesis in order to impart high yield and crystallinity in a short amount of time. An aqueous colloid so formed, when combined with the other materials that comprise the non-polar constituents, conveniently at room temperature, will yield an emulsion with a temperature near 40° C. Such low temperatures compared to prior art process temperatures are a significant advantage afforded by the inventive approach. And near this temperature, in particular embodiments, the presence of glycol ether promoters of the invention cause the emulsion to separate into two phases within about 1 to 4 hours, with substantially complete extraction of the nanoparticles from the aqueous phase into the non-polar phase.

In a particular embodiment, it has been found that it may be beneficial to age (hold) for a predetermined period of time, the emulsion formed from the mixing of the aqueous cerium-containing oxide colloid, the substantially non-polar solvent, and the amphiphilic material (e.g. organic acid), prior to the addition of the glycol ether promoter. In various embodiments, the aging (holding) temperature is in the range of 20-60° C., and the aging (holding) time is in the range of 0 to 8 hours, 0 to 4 hours, or 0 to 2 hours.

The inventors have explored the ternary phase diagram of a combination liquid comprising a non-polar solvent—Kensol® 50H, an amphiphilic material—oleic acid, and the promoter—DEGME. FIG. 1 depicts the ternary phase diagram for the ternary system at room temperature. Note that there are 2 regions: Region A is characterized by a single-phase liquid in which all three of the components are miscible. Region B is characterized by a separation into 2 liquid phases. It may be preferable to choose the ratio of the 3 constituents to be in the single-phase region, while at the same time optimizing other desirable characteristics of the product, for example, long-term colloidal stability of the organic colloid (sol) product. Colloidal stability over the manufacturing process temperatures and product exposure temperatures, both high and low, may need to be considered. Product characteristics of concern may include flowability at low operating temperatures (cold outdoor ambient temperatures) and flash-point at higher potential exposure temperatures. Conveniently and unexpectedly, in some embodiments, product ratios of the three materials of the ternary diagram also provide for an ideal composition for the extraction of nanoparticles from the aqueous colloid to the substantially non-polar colloid.

In some embodiments, it has been found that the low temperature extraction of nanoparticles from the aqueous phase to the substantially non-polar phase is accelerated by forming the emulsion with high shear mixing.

In some embodiments, analysis of the final organic colloid material produced by the inventive process reveals that it is substantially free of constituents of the aqueous reaction mixture in which the nanoparticles were initially formed. Levels of water, nitrates, and nanoparticle stabilizer (e.g. methoxyacetic acid) were all lower than in the comparative process disclosed in the commonly assigned U.S. application Ser. No. 12/549,776 now US Publication 2010/0152077 A1 to Alston et al. Analysis also revealed that a portion of the glycol ether promoter material or materials may be retained in the aqueous phase after phase separation. Optionally, an additional amount of glycol ether is added to the separated substantially non-polar colloid, according to considerations previously stated.

To further illustrate the invention and its advantages, the following examples are given, it being understood that the specific examples are not limiting.

EXPERIMENTAL SECTION

Preparation of $Ce_{0.6}Fe_{0.4}O_{(2-\delta)}$ Aqueous Nanoparticle Dispersion

To an 11 liter round bottom Type-316 stainless steel kettle or reactor with 3 mixing baffles, was added distilled water (Kettle Water), which was maintained at 70° C. Using an impeller, the water was stirred at sufficient speed to provide good mixing. Then 98% methoxyacetic acid was added to the reactor. Two solution introduction jets directed to the impeller blades were put into the reactor and secured. An ammonium hydroxide solution was pumped through one jet at a rate of 69.3 ml/minute. A cerium-iron containing solution (334.5 gram of $Ce(NO_3)_3 \cdot 6H_2O$ and 207.5 gram of $Fe(NO_3)_3 \cdot 9H2O$ with distilled water to make 625 ml) was pumped through the other jet at a delivery rate of 125 ml/minute. The cerium-iron solution was purged from the delivery line with a 15 ml distilled water chase. Then a 50% $H_2O_2$ solution was pumped into the reactor at 9.38 ml/minute using a third jet and was followed by a brief distilled water flush. The reaction mixture was held at 70° C. for an additional sixty minutes, after which time it was cooled to 20° C., providing a stable $Ce_{0.6}Fe_{0.4}O_{2-\delta}$ aqueous nanoparticle colloidal dispersion, wherein δ is between about 1.5 to 2.

Transmission electron microscopy (TEM) grain sizing revealed a particle size of 2.5±0.5 nm. Electron diffraction revealed a distinct $CeO_2$ cubic fluorite electron diffraction pattern. No electron diffraction peaks characteristic of a crystalline iron oxide phase were detected. Ultra-high resolution TEM and electron energy loss spectroscopy revealed a plurality of composite nanoparticles comprised of crystalline cerium oxide rich regions and amorphous iron oxide rich regions.

Example 1

A 100 ml aliquot of $Ce_{0.6}Fe_{0.40}O_{(2-\delta)}$ aqueous nanoparticle dispersion prepared as described above, was added to a 500 ml reaction vessel and heated to a temperature of about 60° C. A 74.0 ml aliquot of Kensol® 50H and 37.6 g of oleic acid were then added, these two materials being at room temperature at the time of addition. The mixture was stirred by manual shaking of the vessel for a period of 1 minute, forming an emulsion. The emulsion mixture was then held at 40° C. to age for 2 hours. Then, 30 ml of DEGME was added to the emulsion and it separated in about 4 hours to yield a stable dark brown non-turbid substantially non-polar colloid phase, above a nearly colorless aqueous phase. The non-polar colloid phase was separated out by pipette. To 100 ml of the separated organic colloid phase was added 13.9 ml of DEGME and 7.2 ml of PGME. Long-term stability observations of samples of the above non-polar colloid were carried out while samples were held in separate 10 ml vials. One was held at room temperature (about 20° C.) and the other at 40° C. At the conclusion of 6 months, the non-polar colloids, remained essentially non-turbid and free of settled precipitates.

Example 2

A 100 ml aliquot of $Ce_{0.6}Fe_{0.4}O_{(2-\delta)}$ aqueous nanoparticle dispersion prepared as described above, was added to a 500 ml reaction vessel and heated to a temperature of about 60° C. A 75.0 ml aliquot Kensol® 50H and 35.9 g of oleic acid were then added, these two materials being at room temperature at the time of addition. The mixture was stirred by manual shaking of the vessel for a period of 1 minute. The emulsion mixture was then held at 40° C. to age for 2 hours. Then, 30 ml of DEGME was added to the emulsion and it was returned to 40° C., thereafter it completely separated in about 4 hours to yield a stable dark brown non-turbid substantially non-polar colloid phase, above a nearly colorless aqueous phase. The non-polar colloid phase was separated out by pipette. To 100 ml of the separated organic colloid phase were added 12.2 ml of DEGME and 9.1 ml of PGME.

Long-term stability observations of samples of the above non-polar colloid were carried out while samples were held in separate 10 ml vials, one at room temperature (about 20° C.) and the other at 40° C. At the conclusion of 6 months, the non-polar colloids, remained essentially non-turbid and free of settled precipitates. Cold temperature stability was also checked at −17° C. and it was found that the sample remained a non-turbid liquid, free of precipitates.

Example 3

A 500 ml aliquot of $Ce_{0.6}Fe_{0.4}O_{(2-\delta)}$ aqueous nanoparticle dispersion prepared as described above, was heated to a temperature of about 60° C. and transferred to a 2 L reaction vessel. The liquid was stirred with a 1%6" R100 (Rushton) impeller that was lowered into the reactor vessel. The mixer head was positioned slightly above the bottom of the reactor vessel. The mixer was set to 1690 rpm. A mixture of 370 ml of Kensol 50H and 188 g of oleic acid, at room temperature, was added to the vessel over a 30 second period. The whole mix was then stirred at 1750 rpm for 2 minutes resulting in the formation of an emulsion. The reaction vessel was then moved to hot plate with magnetic stirrer and stirred using a 2½" magnetic bar at high speed setting. 50 ml of DEGME was then added over 15 seconds. The vessel was then held without stirring at a temperature of about 45° C. After about 4 hours, the emulsion separated completely to yield about 600 ml of dark brown non-turbid organic colloid above an aqueous remnant phase.

Analysis of the organic colloid by Gas Chromatography Mass Spectrometry revealed no detectable amount of methoxyacetic acid, the nanoparticle stabilizer present in the $Ce_{0.6}Fe_{0.4}O_{(2-\delta)}$ aqueous nanoparticle dispersion prepared as described above. This reduction in methoxyacetic acid in the final organic colloid was accompanied by an improvement in long-term stability relative to organic dispersions of similar nanoparticles prepared by the solvent shifting process described by Alston et al. in US Pat. Publication 2010/0152077.

The invention has been described in detail, with particular reference to certain preferred embodiments thereof, but it will be understood that variations and modifications can be effected within the scope of the invention as described above, by a person of ordinary skill in the art, without departing from the scope of the invention.

What is claimed is:
1. A process for preparing a colloidal dispersion, comprising:
   (a) preparing an aqueous colloidal dispersion of cerium-containing oxide nanoparticles;
   (b) adding a substantially non-polar solvent and an amphiphilic material;
   (c) mixing the liquid mixture of step (b) to form an emulsion;
   (d) heating the emulsion to a temperature ranging from about 20° C. to less than 60° C. for a predetermined time, whereafter the emulsion separates into a substantially non-polar colloidal phase and a remnant aqueous phase; and, (e) collecting the separated substantially nonpolar colloidal dispersion of cerium-containing oxide nanoparticles wherein the process further comprises adding at least one glycol ether prior to step (e) in step (b), after step (c), or during step (d), and adding at least one glycol ether to the collected substantially non-polar colloidal dispersion of cerium-containing oxide nanoparticles after step (e), wherein said glycol ether is selected from the group consisting of diethylene glycol monomethyl ether, propylene glycol monomethyl ether, diethylene glycol monoethyl ether, diethylene glycol monobutyl ether, dipropylene glycol methyl ether, ethylene glycol monomethyl ether, ethylene glycol monoethyl ether, ethylene glycol monopropyl ether, and combinations thereof.

2. The process of claim 1, wherein said time ranges from 0 to 8 hours.

3. The process of claim herein the glycol ether added prior to step (e) is added in its entirety during step (d).

4. The process of claim 3, wherein the glycol ether added prior to step (e) is added 0 to 4 hours after the end of step (c).

5. The process of claim 1, wherein said glycol ether is selected from the group consisting of diethylene glycol monomethyl ether, propylene glycol monomethyl ether, and a mixture thereof.

6. The process of claim 1, wherein said glycol ether comprises about 5-25 wt. % of the substantially non-polar solvent, the amphiphilic material, and the glycol ether.

7. The process of claim 1, wherein said amphiphilic material is a monocarboxylic acid having from 6 to 22 carbon atoms.

8. The process of claim 7, wherein said monocarboxylic acid is oleic acid.

9. The process of claim 8, wherein the amount of said carboxylic acid comprises about 25-33 wt. % of the total amount of substantially nonpolar solvent, amphiphilic material, and glycol ether.

10. The process of claim 1, wherein the amount of said substantially nonpolar solvent comprises about 50-63 wt. % of the total amount of substantially nonpolar solvent, amphiphilic material, and glycol ether.

11. The process of claim 1, wherein said cerium-contain oxide nanoparticles have a nominal composition of $Ce_{(1-x)}Fe_xO_{(2-\delta)}$, wherein x ranges from about 0,01 to 0.8 and $\delta$ ranges from about 1 to 2.

12. The process of claim 1, wherein said aqueous colloidal dispersion of cerium-containing oxide nanoparticles is prepared without a conventional nanoparticle isolation step, thereby directly using the aqueous colloid resulting from the nanoparticle synthesis reaction mixture in step (a).

* * * * *

UNITED STATES PATENT AND TRADEMARK OFFICE
CERTIFICATE OF CORRECTION

PATENT NO. : 9,669,375 B2  
APPLICATION NO. : 13/753992  
DATED : June 6, 2017  
INVENTOR(S) : Gary Robert Prok and Stephen Charles Williams Page 1 of 1

It is certified that error appears in the above-identified patent and that said Letters Patent is hereby corrected as shown below:

In the Specification

At Column 5, Lines 40-41, "$Ce_{(1-x)}M_xO_{(2-\delta)}$" should read --$Ce_{(1-x)}M_xO_{(2-\delta)}$--.

At Column 7, Line 2, "thereof In" should read --thereof. In--.

At Column 7, Line 7, "thereof The" should read --thereof. The--.

At Column 7, Lines 22-23, "thereof Choice" should read --thereof. Choice--.

At Column 7, Line 64, "faulted" should read --formed--.

In the Claims

At Column 11, Line 20, Claim 1, "rnonopropyl" should read --monopropyl--.

At Column 11, Line 24, Claim 3, "claim herein" should read --claim 1, wherein--.

At Column 12, Line 11, Claim 8, "rnonocarboxylic" should read --monocarboxylic--.

Signed and Sealed this  
Twenty-eighth Day of May, 2019

Andrei Iancu  
*Director of the United States Patent and Trademark Office*